M. C. SCHWEINERT & H. P. KRAFT.
PUMP CONNECTION OR THE LIKE.
APPLICATION FILED JUNE 16, 1911.

1,213,958.

Patented Jan. 30, 1917.
2 SHEETS—SHEET 1.

WITNESSES:
René Bluine
Fred White

INVENTORS:
Maximilian Charles Schweinert
and Henry P. Kraft,
By Attorneys,
Fraser, Burk & Musers M. C. SCHWEINERT & H. P. KRAFT.
PUMP CONNECTION OR THE LIKE.
APPLICATION FILED JUNE 16, 1911.

1,213,958.

Patented Jan. 30, 1917.
2 SHEETS—SHEET 2.

WITNESSES:
René Bruine
Fred White

INVENTORS:
Maximilian Charles Schweinert
and Henry P. Kraft,
By Attorneys,
Fraser, Turk & Nusle

UNITED STATES PATENT OFFICE.

MAXIMILIAN CHARLES SCHWEINERT, OF WEST HOBOKEN, AND HENRY P. KRAFT, OF RIDGEWOOD, NEW JERSEY.

PUMP CONNECTION OR THE LIKE.

1,213,958.

Specification of Letters Patent. Patented Jan. 30, 1917.

Application filed June 16, 1911. Serial No. 633,598.

*To all whom it may concern:*

Be it known that we, MAXIMILIAN C. SCHWEINERT, residing in West Hoboken, in the county of Hudson and State of New Jersey, and HENRY P. KRAFT, residing in Ridgewood, in the county of Bergen and State of New Jersey, both citizens of the United States, have invented certain new and useful Improvements in Pump Connections or the like, of which the following is a specification.

This invention relates to connections for use principally in inflating tires and aims to provide certain improvements therein.

The principal object of the invention is to provide a pump or tank connection for use in inflating pneumatic tires, combined with a gage for indicating the pressures in the tire, the connection having a means for attachment to a gage and preferably having means for attachment to a tire valve.

In the preferred form of our invention the connection is provided with a check valve located at the point of attachment to the gage, which check valve is adapted to be depressed and held open by the gage, and to be closed when the gage is removed, so that the pump connection is adapted for use with or without the gage.

The invention also includes certain novel means of attaching the connection to a tire valve, whereby a leak-tight joint may be quickly made between the two.

The invention includes certain other features of construction which will be hereinafter more clearly pointed out.

Figure 1:
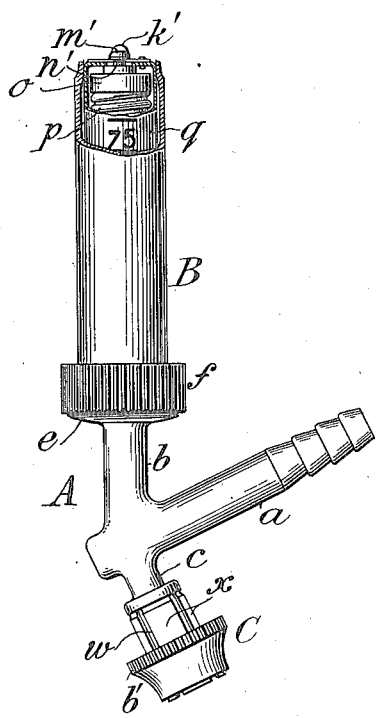
Figure 2:
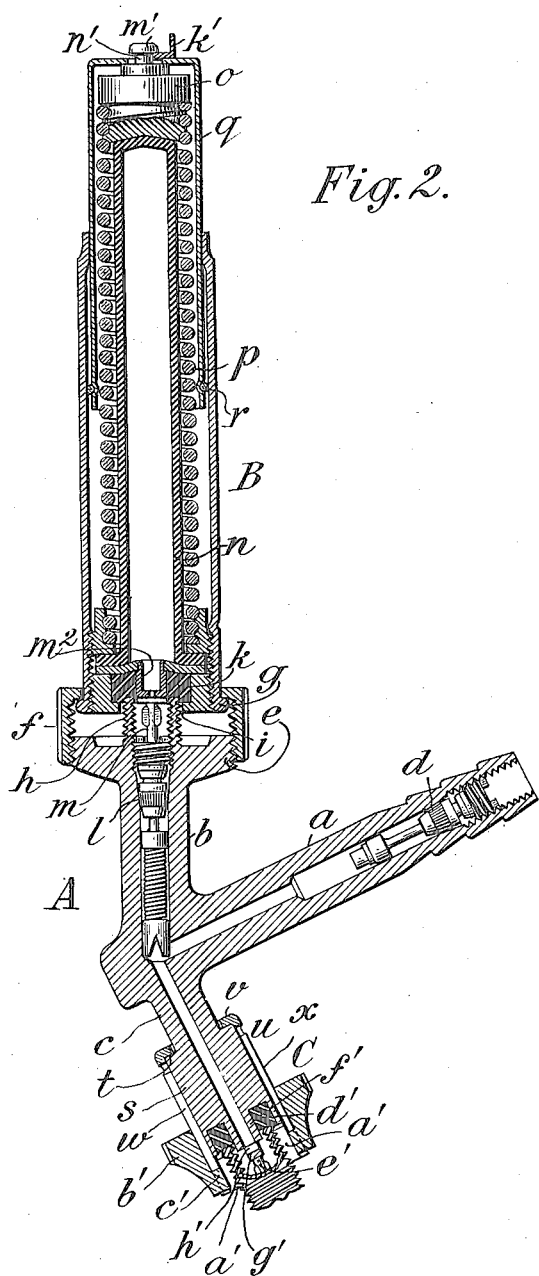
Figure 3:
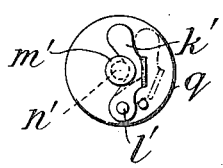
Figure 4:
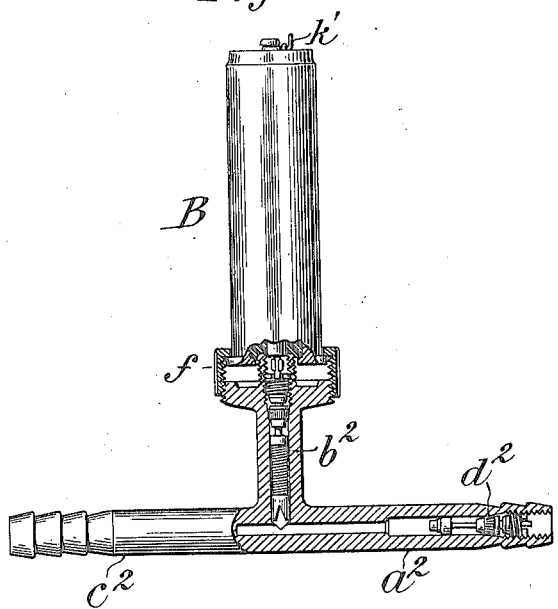
Figure 5:
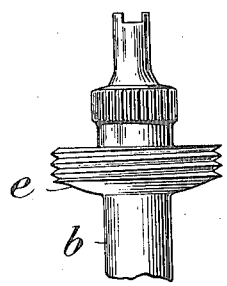

Referring to the drawings illustrating the invention, Figure 1 is a side elevation partly in vertical section showing the invention as applied to a form of connection suitable for use in connection with pumps or inflating tanks. Fig. 2 is an enlarged vertical section of Fig. 1. Fig. 3 is a plan of the top of the gage shown in Figs. 1 and 2. Fig. 4 is an elevation partly in vertical section, illustrating a form of the invention especially designed for use in connection with a tank. Fig. 5 is a view of a detail.

Referring to the drawings, let A indicate the connection as a whole, B the gage and C the means for attaching the connection to a tire valve or the like.

The connection A preferably consists of a member having three branches $a$, $b$ and $c$, all of which are tubular and designed to carry air under pressure. One of the branches $a$ is adapted to be connected with a tube or hose leading from the pump or tank. It is preferably provided with a check valve $d$ designed to prevent back pressure from the tire to the pump or tank. The branch $b$ is adapted for connection to the gage B. For this purpose it is provided with an enlarged collar or flange $e$, screw-threaded on its outer face and having an exterior diameter enlarged to receive a coupling $f$ engaging a flange $g$ on the lower part of the gage B. Beyond the flange $e$ the branch $b$ is provided with an upwardly extending nipple $h$ which is screw-threaded on its exterior and interior surfaces. The nipple $h$ is of approximately the same diameter as the end of the tire valve, and is adapted to fit in a lower opening $i$ of the gage and contact with a packing $k$ of the latter when the coupling is tightened on the flange $e$.

Within the extension $b$ and preferably near the end of the nipple $h$ is located a check valve $l$, the deflating pin $m$ of which is arranged in such relation to the end of the nipple that it is engaged by the deflator $m^2$ of the gage, thus permitting air within the branch $b$ to pass upwardly into the gage. The latter is provided with a rubber tube $n$ closed at its outer end and bearing against a plunger $o$ which is connected to the bottom of the casing by a spring $p$ so that the pressure in the tube $n$ raises the plunger against the tension of the spring. The gage is also provided with a sleeve $q$ against the under side of which the plunger $o$ bears, so that the sleeve is moved upwardly when the plunger rises. This type of gage is illustrated in several applications heretofore filed by Maximilian C. Schweinert and Henry P. Kraft. Normally there is no fixed connection between the plunger and sleeve so that the sleeve remains in the outermost position to which it is forced by the plunger by friction, the plunger retiring when the pressure is relieved. A friction ring $r$ is usually provided to hold the sleeve more positively in its positions.

The provision of a check valve or its equivalent by means of which the opening through the branch $b$ may be closed is important in that it permits a pump connection to be used whether or not a gage is employed. Thus also if by any means the gage should become inoperative as by the perforation of the rubber tube $n$, it may be removed and the connection remains air tight and may be utilized as before. Preferably the valve is in the form of an automatic check valve so that no attention need be paid to it in case the gage is removed. The provision of a nipple of the general proportions as illustrated also enables it to receive an ordinary valve cap as shown in Fig. 5, so that additional protection against leakage is afforded if desired.

The invention also permits the use of a hand pump having an ordinary pump coupling adapted to engage a tire valve if the pump usually employed should become inoperative. The nipple $h$ or equivalent device is adapted to receive a pump connection and provides a means for this purpose. In the form shown an ordinary pump coupling adapted to engage either the outside or inside of a tire valve will also engage the nipple. If air is forced into the coupling connection through the branch $b$ it cannot escape through the branch $a$, since this is controlled by the check valve $d$. It must hence enter the tire valve through the coupling C.

The coupling C is constructed according to our invention so that it may be quickly and easily attached to and detached from a tire valve or the like. To this end the branch $c$ is preferably provided with an enlarged outer portion $s$, the inner end of which is formed with a shoulder $t$. Surrounding the portion $s$ and swiveled thereto is a split tubular member $u$ having at its inner end a flange $v$ engaging the shoulder $t$, which flange is turned down into place after the parts are united. The member $u$ is formed with a series of slots $w$ preferably extending from the outer end of the tubular member to a point near the flange $v$, so as to provide in effect a series of spring arms $x$ which preferably normally have a tendency to spring outward. Each of the arms is provided at its outer end with a screw-threaded portion $a'$ designed to engage the exterior screw-thread of a tire valve. Surrounding the member $u$ is a sliding collar $b'$ which is preferably formed on its inner side with a series of projections $c'$ designed to enter into the slots $w$. When the sliding collar $b'$ is pushed inwardly the spring arms are free to move outwardly to such an extent that their screw-threaded portions will pass over the screw-threaded interior of the valve shell, so that the latter may enter in between the arms. When the collar is pushed outwardly toward the end of the member $u$ the diameter of the effective opening in the outer end of the member $u$ is so reduced that the threads of the latter engage the threads of the valve shell. By rotating the collar $b'$ (and with it the member $u$) a short distance a firm connection is made with the valve shell.

The enlarged end $s$ of the branch $c$ is provided with a packing washer $d'$ which is designed to contact with the outer end of the valve shell to make a leak-tight joint between the parts. Preferably the enlarged portion $s$ is formed with an annular recess adapted to receive the washer. The portion $s$ is also provided with a deflating means for pressing down the valve stem $e'$ of the tire valve. Such means are shown as comprising a tubular nipple $f'$ formed integrally upon the portion $s$ and bored to near its outer end, where it is provided with a projection $g'$ adapted to contact with the deflating pin $e'$. The nipple is provided with a passage or passages $h'$ through which the air can reach the bore of the branch $c$. By this construction the pump connection may be very quickly and firmly attached to the tire valve with a leak-tight joint. The packing is carried upon a fixed part, and the deflator is also fixed to and preferably forms a part of the branch $c$ whereby simplicity and economy are obtained.

In the use of the invention in connection with a pump or tank the influx of air is apt to raise the plunger $o$ of the gage to a point beyond the proper normal pressure. In order that the sleeve $q$ or other indicating member may return with the plunger and finally reach the proper pressure, means are provided to connect the plunger with the indicating member, such means being best shown in Figs. 2 and 3. These means comprise preferably a catch $k'$ which is shown as pivoted at $l'$ to the top part of the sleeve. The catch is designed to engage a stud $m'$ or other suitable member carried upon the plunger. As shown the stud is fixed to the upper part of the plunger and is provided with a neck $n'$ into which the catch $k'$ fits. This construction provides a secure and yet easily attachable and detachable connection between the two parts.

The means provided to suspend the registering feature of the gage by connecting the plunger with the indicating member are not claimed herein but are claimed in a divisional application Serial No. 85,624, filed March 21, 1916.

When the device is provided with a pump coupling, it is desirable that the branch $b$ shall be angularly arranged with relation to the branch $c$ in order that the gage may be brought outside of the plane of the wheel. In the usual size of automobile wheel there is sometimes not room to accommodate the gage between the spokes of the wheel, and the angular relation hence permits the use of a gage of longer dimensions than would sometimes otherwise be possible.

It is sometimes desirable to separate the gage from the tire valve, especially when the connection is used with a compressed air tank. Under these circumstances it may be preferable to locate the gage near the tank so that the attendant can shut off the air at the tank when the desired pressure is reached. In Fig. 4 we have shown a connection especially adapted for this purpose in which there are three branches as before, $a^2$, $b^2$ and $c^2$. In this construction the branches $a^2$ and $c^2$ are preferably arranged in line. The branch $a^2$ is adapted for connection to the tank by a short length of hose and is provided with a check valve $d^2$ similar in function to the valve $d$ of Fig. 1. The branch $c^2$ is adapted for connection with a tube or hose leading to the tire. The branch $b^2$ is identical in construction with the branch $b$ and need not hence be further described.

While certain embodiments of the invention have been shown and described, it is understood that the invention is not limited thereto since various changes may be made therein without departing from the spirit of the invention.

The term "branches" has been used to facilitate the description of the invention. It will be understood that the shell of the connection may consist of a single block with appropriate passages or any other suitable construction may be availed of. Other changes may also be made.

What we claim is:—

1. A coupling of the character described having a plurality of passageways greater than two, one having a nipple adapted to lead to the interior of a gage, and having means for connection with a tire valve, and said nipple being of substantially the same diameter as said tire valve, and being screw-threaded interiorly and exteriorly.

2. A coupling of the character described having a plurality of passageways greater than two, one having an enlarged flange provided with a screw-thread on its exterior, and a relatively small nipple surrounded by said flange and adapted to contact with the packing of a gage, said nipple being screw-threaded to receive a pump coupling.

In witness whereof, we have hereunto signed our names in the presence of two subscribing witnesses.

MAXIMILIAN CHARLES SCHWEINERT.
HENRY P. KRAFT.

Witnesses:
EUGENE V. MYERS,
THOMAS F. WALLACE.